US010781903B2

(12) United States Patent
Aldadou et al.

(10) Patent No.: US 10,781,903 B2
(45) Date of Patent: Sep. 22, 2020

(54) SLIDER-CRANK MECHANISM FOR ELIMINATING SIDE FORCES

(71) Applicant: TADATEC, LLC, Ann Arbor, MI (US)

(72) Inventors: (Moh'd Hamzeh) F. M. Aldadou, Amman (JO); Emadeddin Y. H. Tanbour, Ann Arbor, MI (US)

(73) Assignee: TADATEC, LLC, Ann Arbor, MI (US)

( * ) Notice: Subject to any disclaimer, the term of this patent is extended or adjusted under 35 U.S.C. 154(b) by 122 days.

(21) Appl. No.: 15/811,983

(22) Filed: Nov. 14, 2017

(65) Prior Publication Data

US 2019/0145507 A1    May 16, 2019

(51) Int. Cl.
| | | |
|---|---|---|
| *F16H 37/12* | (2006.01) | |
| *F16H 21/36* | (2006.01) | |
| *F01B 9/04* | (2006.01) | |
| F16H 21/40 | (2006.01) | |
| F16H 19/04 | (2006.01) | |
| F02B 75/32 | (2006.01) | |

(52) U.S. Cl.
CPC .......... *F16H 37/124* (2013.01); *F01B 9/047* (2013.01); *F16H 21/36* (2013.01); *F02B 75/32* (2013.01); *F16H 19/04* (2013.01); *F16H 21/40* (2013.01)

(58) Field of Classification Search
CPC ...... F16H 37/00; F16H 37/124; F16H 37/126; F16H 19/04; F16H 19/043; F16H 21/18; F16H 21/34; F16H 21/40; F16H 21/44; F02B 75/32; F01B 9/026; F01B 15/02; F01B 21/02; F01B 9/02; F16J 7/00

USPC ............... 74/33, 40, 44, 46, 65, 66, 67, 68; 123/193.6, 197.3, 197.4, 50 A, 52.4, 123/197.1, 406.74; 417/460, 464; 92/31, 92/187

See application file for complete search history.

(56) References Cited

U.S. PATENT DOCUMENTS

| | | | | |
|---|---|---|---|---|
| 370,709 | A * | 9/1887 | Mathias ................ | F16H 19/043 74/32 |
| 595,732 | A * | 12/1897 | Pitt ......................... | F16H 19/04 74/29 |
| 978,981 | A * | 12/1910 | Bennett ................... | F16H 21/32 74/40 |
| 1,384,339 | A * | 7/1921 | Powell .................... | F16H 21/18 74/40 |
| 1,433,649 | A * | 10/1922 | Powell .................... | F02B 25/00 123/65 V |

(Continued)

*Primary Examiner* — Jake Cook
*Assistant Examiner* — T. Scott Fix
(74) *Attorney, Agent, or Firm* — Michael Best & Friedrich LLP (57) ABSTRACT

A slider-crank mechanism includes a slider, a shaft, and a drive train correlating reciprocation of the slider with continuous rotation of the shaft. The slider reciprocates along a slider axis with respect to a slider surface. The drive train includes a linear actuator connected to the slider for substantially pure collinear movement with the slider to substantially eliminate side forces between the slider and slider surface. The slider and drive train may include a rack-and-pinion configuration. The rack-and-pinion may drive or be driven by a Grashofian four-bar crank-rocker linkage that includes a rocker arm, floating link, web, and the shaft. The slider-crank mechanism may be employed in a power generation system such as an internal combustion engine or a power consuming system such as a compressor or pump.

19 Claims, 11 Drawing Sheets

(56) References Cited

U.S. PATENT DOCUMENTS

| | | | | |
|---|---|---|---|---|
| 2,315,684 A * | 4/1943 | Benson | D06F 5/04 | 68/122 |
| 3,401,568 A * | 9/1968 | Blatt | F16H 21/365 | 74/37 |
| 3,459,056 A * | 8/1969 | Lea | F16H 35/00 | 74/32 |
| 3,956,942 A * | 5/1976 | Seki | F16H 21/18 | 74/52 |
| 4,433,649 A * | 2/1984 | Shin | F01B 9/047 | 123/197.5 |
| 4,899,606 A * | 2/1990 | Harris | B23P 19/02 | 74/29 |
| 4,974,554 A * | 12/1990 | Emery | F02B 41/04 | 123/197.3 |
| 4,979,476 A * | 12/1990 | Islas | F16F 15/26 | 123/197.4 |
| 5,353,690 A * | 10/1994 | Shin | F01B 9/047 | 74/110 |
| 5,934,243 A * | 8/1999 | Kopystanski | F01B 9/047 | 123/197.1 |
| 6,354,252 B1 * | 3/2002 | Rabhi | F01B 9/047 | 123/78 BA |
| 6,601,551 B1 * | 8/2003 | Rabhi | F02B 75/045 | 123/78 E |
| 6,904,888 B1 * | 6/2005 | Heifets | F02B 75/24 | 123/197.1 |
| 7,562,642 B2 * | 7/2009 | Rabhi | F01B 9/02 | 123/48 B |
| 9,574,645 B2 * | 2/2017 | Farcy | F16H 19/04 | |
| 2004/0168669 A1 * | 9/2004 | Rabhi | F02B 75/045 | 123/197.3 |
| 2005/0076728 A1 * | 4/2005 | Rastegar | F16H 21/18 | 74/25 |
| 2006/0288809 A1 * | 12/2006 | Fleytman | F16H 19/04 | 74/89.11 |
| 2010/0294232 A1 * | 11/2010 | Otterstrom | F01B 9/047 | 123/197.1 |

* cited by examiner

SLIDER-CRANK MECHANISM FOR ELIMINATING SIDE FORCES

BACKGROUND

The present invention relates to a slider-crank mechanism that eliminates side forces generated by the connecting rod in a traditional slider-crank configuration.

In a traditional slider-crank mechanism, the connecting rod between the slider and crank transfers linear motion into rotary motion or vice-versa. An example of an application for a traditional slider-crank mechanism is a reciprocating machine (e.g., internal combustion engine or piston pump) in which the slider is in the form of a piston. Due to the inclination between the connecting rod and the slider path, a force component perpendicular to the slider path is generated. Such perpendicular forces may be referred to as "side forces." Side forces can generate large amounts of friction between the slider and the surface along which the slider moves. The friction can lead to power loss, which can sometimes be sizeable. Such power loss contributes to loss of efficiency in the reciprocating machine.

SUMMARY

In one embodiment, the invention provides a slider-crank mechanism comprising: a slider for reciprocation along a slider axis with respect to a slider surface; a shaft for rotation about a shaft axis; and a drive train correlating reciprocation of the slider with continuous rotation of the shaft in a single direction, the drive train including a linear actuator connected to the slider for substantially pure collinear movement with the slider to substantially eliminate side forces between the slider and slider surface.

In one aspect of the invention, the slider comprises a piston and the slider surface comprises a bore in which the piston reciprocates. In another aspect of the invention, the shaft comprises an input shaft and reciprocation of the slider is driven by operation of the drive train in response to rotation of the input shaft. In another aspect of the invention, the shaft comprises an output shaft and rotation of the shaft is driven by operation of the drive train in response to reciprocation of the slider. In another aspect of the invention, the linear actuator includes a first engagement surface; and the drive train includes a rocker assembly supported for rotary oscillation, the rocker assembly having a rocker engagement surface interfacing with the first engagement surface to correlate rotary oscillation of the rocker assembly with substantially pure collinear movement of the linear actuator and slider. In another aspect of the invention, the first engagement surface and the rocker engagement surface are both gear teeth arranged in a herringbone configuration or double helical configuration. In another aspect of the invention, the drive train further includes a floating link and web interconnecting the rocker assembly and the shaft to correlate rotary oscillation of the rocker assembly with continuous rotation of the shaft in the single direction. In another aspect of the invention, the shaft, web, floating link, and rocker assembly define a four-bar linkage. In another aspect of the invention, the four-bar linkage comprises a crank-rocker with a time ratio of one. In another aspect of the invention, the slider-crank mechanism further comprises a support member engaging a second engagement surface of the linear actuator to maintain the first engagement surface and rocker engagement surface in contact and maintaining the linear actuator in alignment with the slider axis. In another aspect of the invention, the drive train comprises a Grashofian four-bar crank-rocker linkage.

The another embodiment, the invention provides a machine incorporating a slider-crank mechanism that comprises: a slider for reciprocation along a slider axis with respect to a slider surface; a shaft for rotation about a shaft axis; and a drive train correlating reciprocation of the slider with continuous rotation of the shaft in a single direction, the drive train including a linear actuator connected to the slider for substantially pure collinear movement with the slider to substantially eliminate side forces between the slider and slider surface; wherein the machine generates power by driving reciprocation of the slider with a source of energy to rotate the shaft through the drive train.

In another embodiment, the invention provides a machine incorporating a slider-crank mechanism that comprises: a slider for reciprocation along a slider axis with respect to a slider surface; a shaft for rotation about a shaft axis; and a drive train correlating reciprocation of the slider with continuous rotation of the shaft in a single direction, the drive train including a linear actuator connected to the slider for substantially pure collinear movement with the slider to substantially eliminate side forces between the slider and slider surface; wherein the machine consumes power by driving rotation of the shaft with a source of energy to cause reciprocation of the slider through the drive train.

In one aspect of the invention, the slider comprises a piston and the slider surface comprises a bore in which the piston reciprocates. In another aspect of the invention, the linear actuator comprises a rack having a first end connected to the slider and having a first engagement surface; and the drive train includes a rocker assembly supported for rotary oscillation, the rocker assembly having a rocker engagement surface interfacing with the first engagement surface to correlate rotary oscillation of the rocker assembly with substantially pure collinear movement of the rack and slider. In another aspect of the invention, the drive train further includes a floating link and web interconnecting the rocker assembly and the shaft to correlate rotary oscillation of the rocker assembly with continuous rotation of the shaft in the single direction, the shaft, web, floating link, and rocker assembly define a Grashofian four-bar crank-rocker linkage having a time ratio of one.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-6 schematically illustrate a slider-crank mechanism 100 according to the present invention. These figures illustrate a complete cycle of operation of the invention in four positions.

The slider-crank mechanism 100 includes a slider 110, a slider surface 120, a shaft 130, and a drive train 140. The slider 110 moves in pure reciprocation with respect to the slider surface 120 along a slider axis 110A. As used herein, the term "pure reciprocation" means back-and-forth movement substantially only along an axis, with substantially no off-axis or side component of movement. Unless specified otherwise, it will be assumed that all reciprocation referred to in this specification is pure reciprocation. The slider surface 120 extends parallel to the slider axis 110A. In some applications of the present invention, for example, the slider 110 may be a piston and the slider surface 120 may be a bore in which the piston reciprocates. The slider surface 120 can be said to support or guide the slider 110. The slider 110 may be, for example, a piston of circular cross-section and the slider surface 120 may be a cylindrical bore, with the slider axis 110A defining the geometric center of the bore.

The shaft 130 is supported for pure continuous rotation about a shaft axis 130A extending into the page in FIGS. 1-6 along the length of the shaft 130. The shaft 130 may also be referred to as a "crank." The shaft axis 130A is perpendicular to the slider axis 110A. As used herein, "pure rotation" means rotation substantially only about an axis, with substantially no off-axis component of rotation. Also, the term "continuous" means that the rotation is in only one direction (clockwise or counterclockwise). Unless specified otherwise, it will be assumed that all rotation referred to in this specification is pure, continuous rotation. The term "rotary oscillation" means rotation in which the direction of rotation periodically reverses.

The drive train 140 correlates pure reciprocation of the slider 110 to pure continuous rotation of the shaft 130. As used herein, "correlates" means that the motion of one element drives the motion of another element. In this respect, the drive train's 140 correlation of slider 110 reciprocation with shaft 130 rotation includes both: (a) converting slider 110 pure reciprocation into shaft 130 pure continuous rotation (as in a power generation machine such as diesel and gasoline engines and power generation applications); and (b) converting shaft 130 pure continuous rotation into slider 110 pure reciprocation (as in a power consumption machine such as a piston pump or compressor). The drive train 140 includes a linear actuator 150, a support member 160, a rocker assembly 170, a floating link 175, and a web 180.

The linear actuator 150 extends parallel to the slider axis 110A. Force from the slider 110 to the linear actuator 150 (if the slider-crank mechanism 100 is operating as a power generation machine) or from the linear actuator 150 to the slider 110 (if the slider-crank mechanism 100 is operating as a power consuming machine) is collinear with the slider axis 110A, as will be discussed in more detail below. In FIGS. 1-6, the linear actuator 150 is schematically represented as a symmetrical, elongated element having a geometric longitudinal axis that is collinear with the slider axis 110A. The linear actuator 150 is interconnected with the slider 110 such that the slider 110 and linear actuator 150 reciprocate together along the slider axis 110A.

The linear actuator 150 includes a first engagement surface 150A facing in a first direction and a second engagement surface 150B facing in a second direction that is opposite the first direction. The linear actuator 150 may take the form of, for example, a rack and the first and second engagement surfaces 150A, 150B may comprise first and second sets of rack teeth facing in opposite directions. In other constructions, the first engagement surface 150A may be another type of surface that can reliably engage the rocker assembly 170 to correlate linear movement of the linear actuator 150 to rotary movement of the rocker assembly 170. Such engagement may be via teeth, friction, or any other suitable mechanism for coupling the linear actuator 150 with the rocker assembly 170.

The second engagement surface 150B may alternatively be another type of surface that can reliably interface with the support member 160 in manner that maintains the engagement of the first engagement surface 150A with the rocker assembly 170. Such interfacing of the second engagement surface 150B with the support member 160 may apply a light normal force in a direction perpendicular to the slider axis 110A to maintain engagement of the first engagement surface 150A with the rocker assembly 170. Alternatively, the interfacing of the second engagement surface 150B with the support member 160 may precisely maintain the linear actuator 150 in alignment with the slider axis 110A to prevent movement of the first engagement surface 150A out of engagement with the rocker assembly 170 without any normal force perpendicular to the slider axis 110A.

The illustrated support member 160 is supported for rotary oscillation on a support axis 160A. The support member 160 includes a support engagement surface 160B that engages the second engagement surface 150B of the linear actuator 150. In the illustrated construction, the support engagement surface 160B is a segment of a circle centered on the support axis 160A, and the second engagement surface 150B engages the support engagement surface 160B on a tangent to the support engagement surface 160B.

The interface between second engagement surface 150B and the support engagement surface 160B may take numerous forms, provided that the interface enables the support member 160 to perform its primary purpose of preventing the first engagement surface 150A from disengaging from the rocker assembly 170. For example, the interface between the second engagement surface 150B and the support engagement surface 160B may include coupling by teeth, rolling contact, or another suitable mechanism.

The rocker assembly 170 includes a rotary component 185 supported for rotary oscillation on a rocker axis 170A, and a rocker arm 190 which is rigidly mounted to or integrally formed with the rotary component 185. The rotary component 185 and rocker arm 190 may be provided as separate components that are rigidly coupled (e.g., by welding, fastening, or other suitable form of rigid coupling) or may be cast or otherwise formed as a single, integrated piece.

The support axis 160A and rocker axis 170A extend perpendicular to the plane of FIGS. 1-6, and are parallel to each other. The support axis 160A and rocker axis 170A are spaced from and perpendicular to the slider axis 110A on opposite sides of the slider axis 110A, although in some constructions they are not spaced the same distance from the slider axis 110A. A level line 195 is perpendicular to both the support axis 160A and the rocker axis 170A and is also perpendicular to the slider axis 110A. As such, the support axis 160A and rocker axis 170A are level with each other (i.e., intersect a level line 195 that intersects and is perpendicular to the slider axis 110A). The support axis 160A is on one side of the slider axis 110A and the rocker axis 170A is on the opposite side of the slider axis 110A.

The rotary component 185 includes a rocker engagement surface 170B that couples with or engages the first engagement surface 150A of the linear actuator 150. The first engagement surface 150A of the linear actuator 150 engages the rocker engagement surface 170B on a tangent to the rocker engagement surface 170B. As noted above, the first engagement surface 150A may be of any type that reliably engages the rocker engagement surface 170B to correlate linear movement of the linear actuator 150 to rotary movement of the rocker assembly 170. Such engagement may be via teeth, friction, or any other suitable mechanism for coupling the linear actuator 150 with the rocker assembly 170.

It is preferable that the engagement between the first engagement surface 150A and the rocker engagement surface 170B be an engagement or coupling that is free from slipping between the components. As such, a given linear displacement of the linear actuator 150 always correlates to the same rotary displacement of the rocker assembly 170. Although illustrated schematically as a circular gear or friction wheel, the rotary component 185 may take the form of any suitable component. An example of an alternative rotary component 185 is a sector gear having a rocker engagement surface 170B (e.g., teeth) only on a portion of the rotary component 185 that engages the first engagement surface 150A.

The rocker arm 190 extends radially from the rocker axis 170A to a distal end 190A of the rocker arm 190. As the rocker arm 190 undergoes reciprocating rotation, the distal end 190A bobs up and down along an arc 190B having a rocker arc length calculated as S=r*Θ, in which "S" is the rocker arc length described by the distal end 190A of the rocker arm 190, "r" is length of the rocker arm 190 measured from the rocker axis 170A to the distal end 190A, and "Θ" is the angle (in radians) through which the rocker arm 190 rotates. The value for "Θ" can be expressed in degrees if the following equation is used: S=2πr*(Θ/360).

The floating link 175 and web 180 transform rotary oscillation of the rocker assembly 170 into continuous rotation of the shaft 130. In the schematic illustration of FIGS. 1-6, one end of the web 180 is rigidly fixed to the shaft 130 and the web 180 extends radially with respect to the shaft axis 130A to a distal end 180A (which may be in the form of a crank pin, for example). As the web 180 rotates with the shaft 130, the distal end 180A of the web 180 describes a circle akin to the arm of a clock, with the center of the circle being on the shaft axis 130A.

The floating link 175 includes a first end 175A pivotally coupled to the distal end 180A of the web 180 and a second end 175B pivotally coupled to the distal end 190A of the rocker arm 190. This pivotal coupling may be accomplished with a pinned connection including a coupling pin or the like that creates a hinge joint between the distal ends 180A, 190A of the web 180 and rocker arm 190 and the respective ends 175A, 175B of the floating link 175.

The rocker arm 190, floating link 175, web 180, and shaft 130 may be collectively referred to as a crank-rocker mechanism with a time ratio of one. "Time ratio of one" means that the stroke of the rocker arm 190 (i.e., the rocker arm 190 moving from its full-up position to its full-down position or vice versa) corresponds to 180 degrees of rotation of the shaft 130. Thus, a full cycle of operation of the rocker arm 190 (i.e., two strokes) equals 360 degrees of rotation of the shaft 130. If there is no slippage between the first engagement surface 150A of the linear actuator 150 and the rocker engagement surface 170B of the rocker assembly 170, a full cycle of slider movement 110 (i.e., two passes or strokes through the full range of motion) corresponds exactly to a full cycle of operation of the rocker arm 190 and 360 degrees of shaft rotation 130.

The crank-rocker mechanism can be characterized as a Grashofian four-bar crank-rocker linkage, which is a four-bar linkage in which one of the links rotates in a continuous circle. The four-bar linkage is constructed according to the inequality s+l<p+q, where "s" is the length of the shortest link (the web 180 in the illustrated example), "l" is the length of the longest link (the floating link 175 in the illustrated example), and "p" and "q" are the lengths of the remaining two links. In the illustrated example, "p" is the length of the rocker arm 190 and "q" is the distance between the shaft axis 130A and the rocker axis 170A. The distance between the shaft axis 130A and rocker axis 170A is fixed, and can be modeled as a fixed-length link of the four-bar linkage. In light of this modeling, the slider 110 and linear actuator 150 may be thought of or characterized as a linear reciprocator that either drives or is driven by the crank-rocker mechanism or Grashofian four-bar crank-rocker linkage. The rotational momentum of the shaft 130 prevents the mechanism from being stuck in a locking position with the floating link 175 and web 180 coaxially aligned, a situation that occurs in the power generation mode.

The basic operation of the slider-crank mechanism 100 will now be described with respect to FIGS. 1-6. It will be understood that this description applies equally to the slider-crank mechanism 100 operating as a power generating device or a power consuming device. Directional indications (e.g., up, down, clockwise, counterclockwise) will be used with respect to the attitude of the illustrated slider-crank mechanism 100. In this illustration, the slider 110 moves vertically (up and down). It will be understood that the slider-crank mechanism 100 could be turned to essentially any angle such that that the slider 110 is moving horizontally (side to side) or any angle between vertical and horizontal. Also, the illustrations show the shaft 130 rotating clockwise, but could alternatively be counterclockwise without affecting the functionality of the slider-crank mechanism 100. For convenience, the rotational angle of the web 180 is characterized as if it were a hand of a clock.

Figure 3:
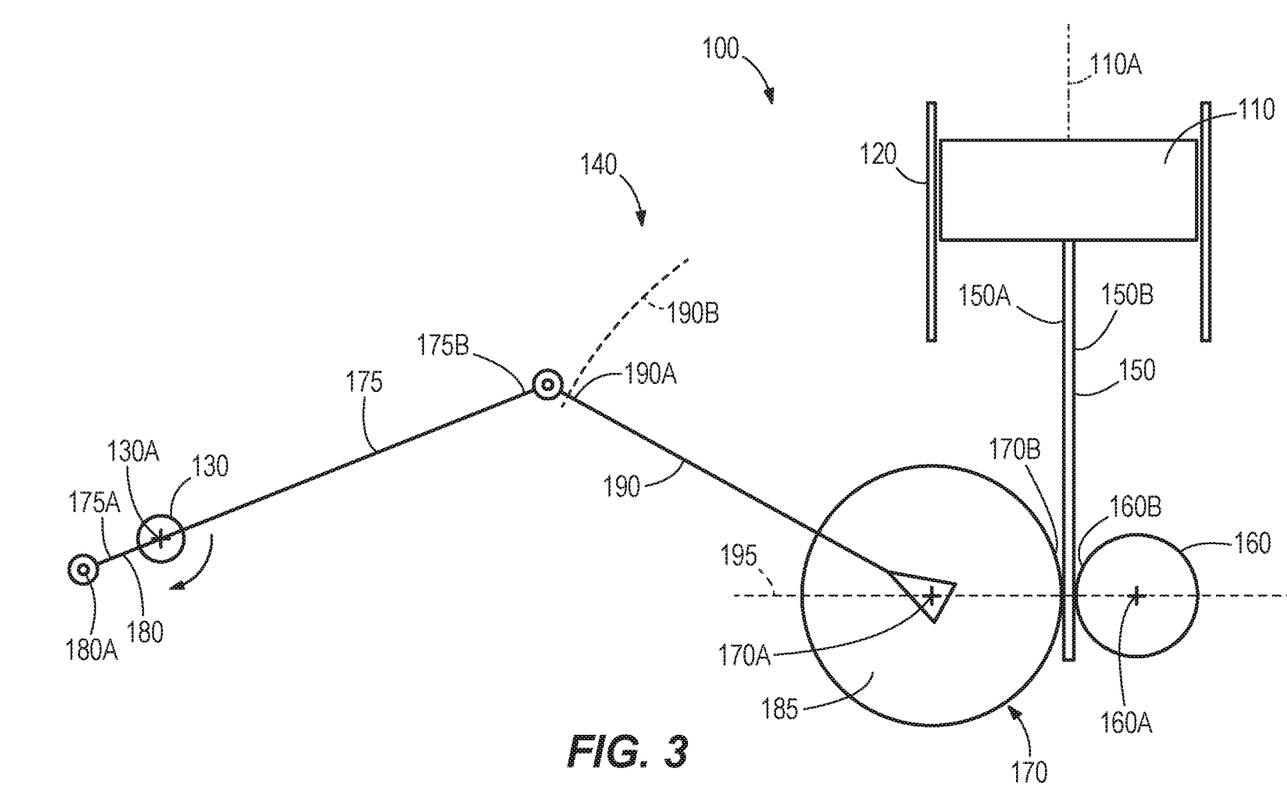
FIG. 3 is a schematic representation of the present invention in a third position corresponding to top dead center.
Figure 6:
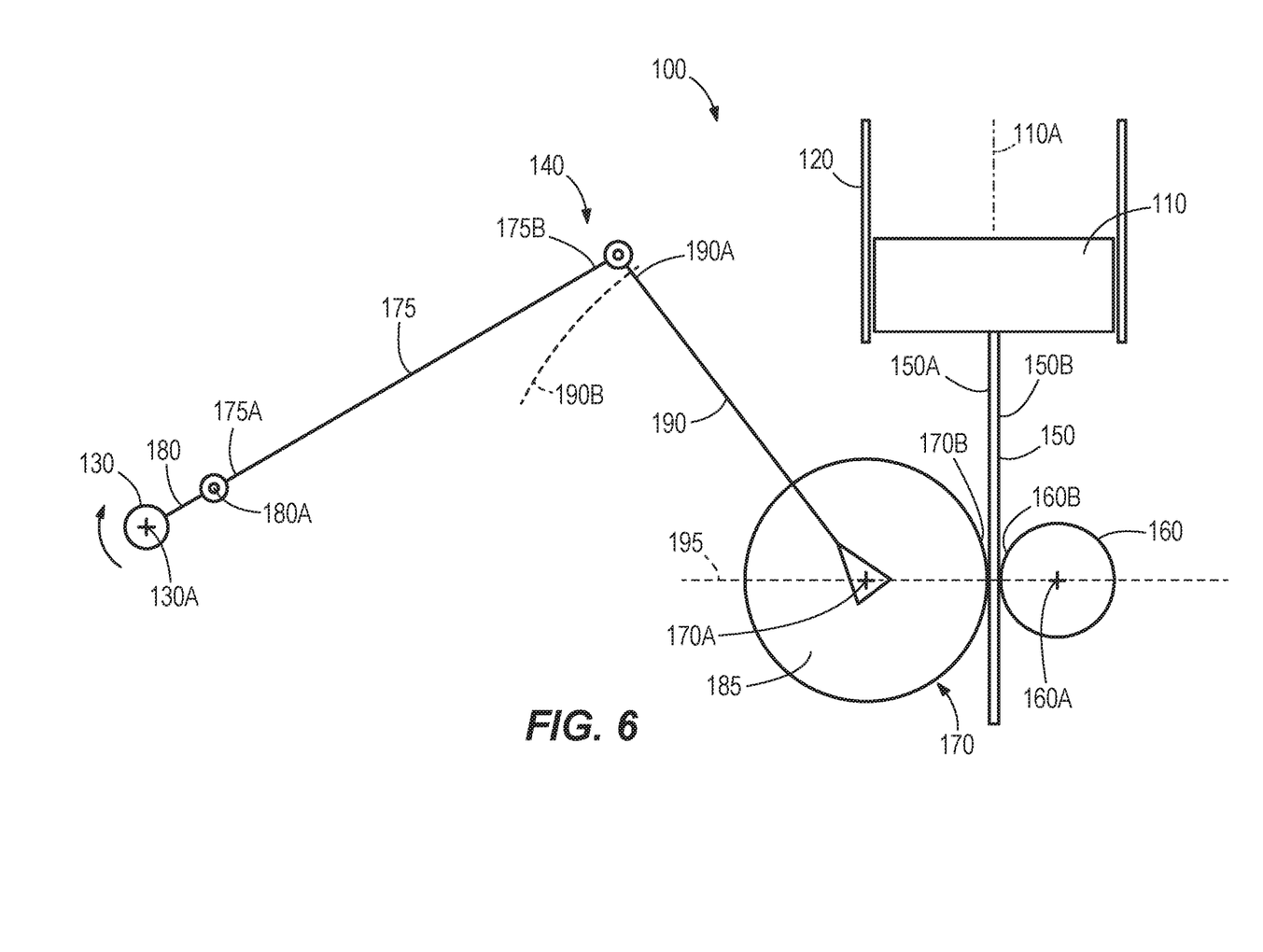
FIG. 6 is a schematic representation of the basic components and functionality of the present invention in a sixth position of operation.

The slider-crank mechanism 100 has two distinct positions in which the slider 110 reaches its maximum up position and minimum bottom position. Referring to FIG. 3, the maximum up position which is also called top dead center is reached when the web 180 and the floating link 175 are coaxially aligned and overlapping each other. Referring to FIG. 6, the minimum bottom position which is also called the bottom dead center is reached when the web 180 and the floating link 175 are coaxially aligned and extending each other. Between these two positions, the web 180 rotates 180 degrees about the axis of the shaft 130, thus, guaranteeing a time ratio of one.

Figure 1:
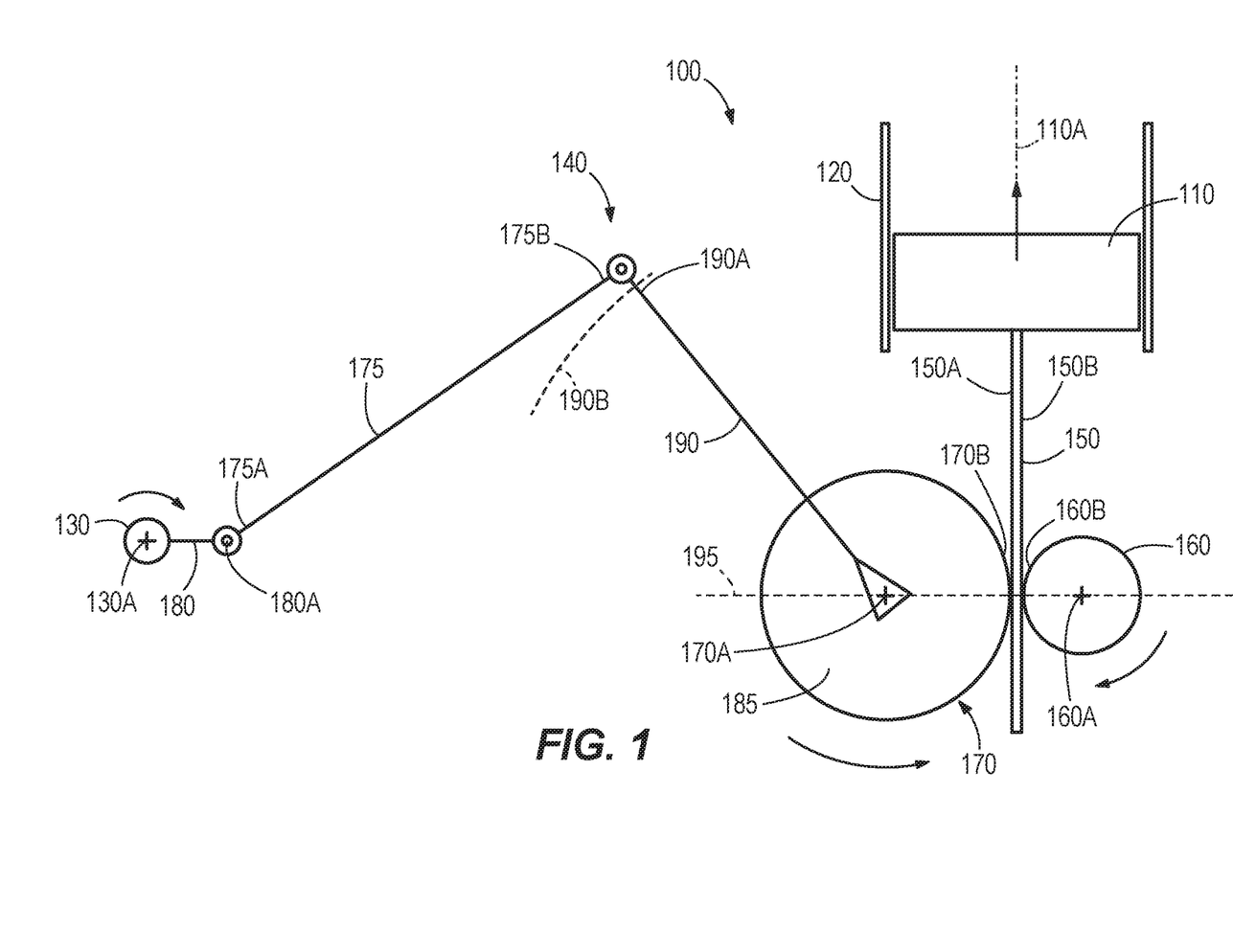
FIG. 1 is a schematic representation of the basic components and functionality of the present invention in a first position of operation.

In FIG. 1, the slider 110 is relatively low with respect to the slider surface 120 and the web 180 is at three o'clock. The slider 110 is rising up from bottom dead center, the rocker assembly 170 is rotating counterclockwise (downward), and the shaft 130 is rotating clockwise as indicated with arrows in FIG. 1.

Figure 2:
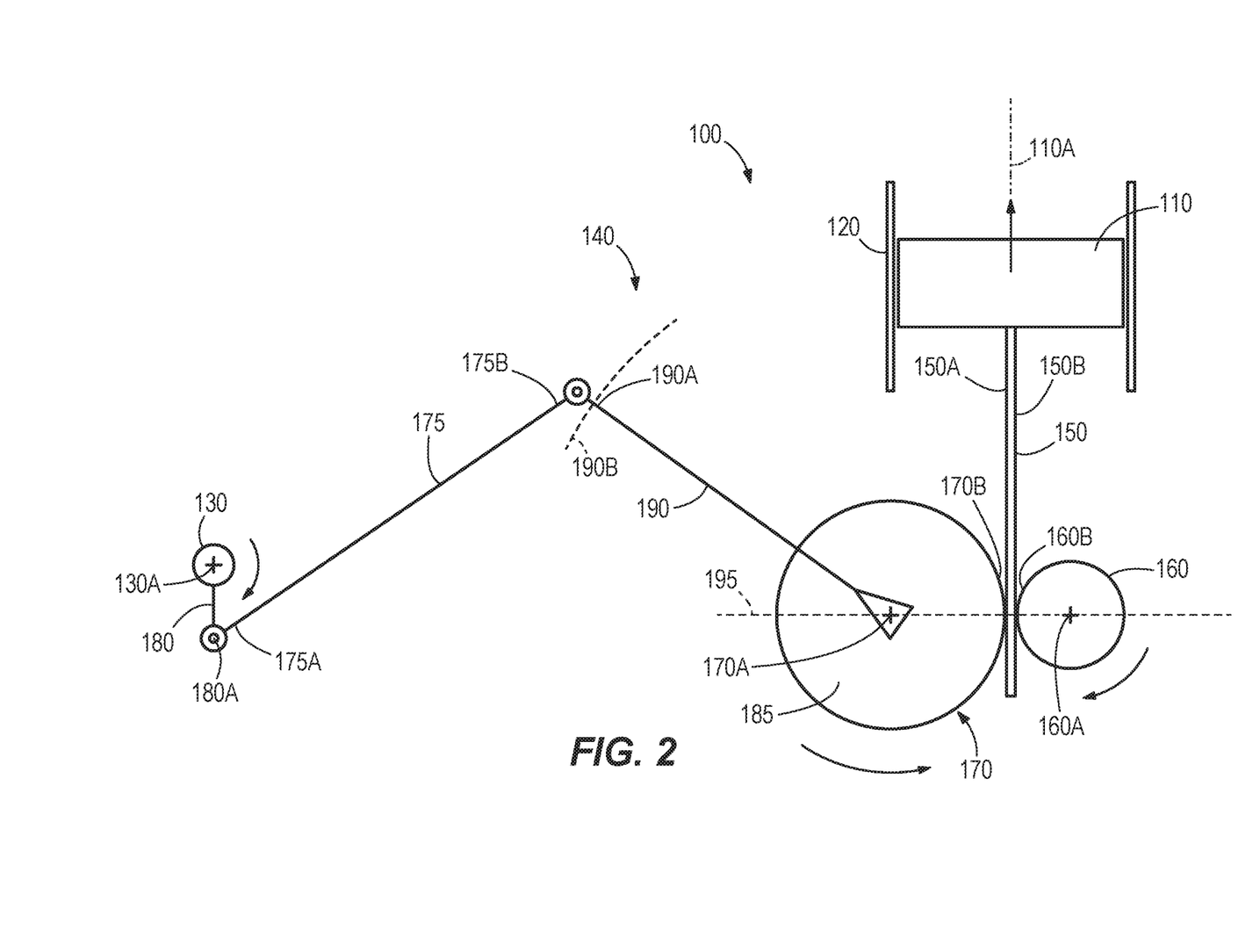
FIG. 2 is a schematic representation of the basic components and functionality of the present invention in a second position of operation.

In FIG. 2, the web 180 has rotated clockwise under the shaft 130 to about six o'clock as the slider 110 has ascended more than halfway through its range of motion and is heading toward the top dead center position. The rocker arm 190 continues to rotate counterclockwise, on a downward stroke.

In FIG. 3, the slider 110 is at top dead center. The web 180 and floating link 175 are overlapping, with the web at about seven-thirty on an imaginary clock face. The slider 110 comes to a temporary stop as it reaches the top of its range of motion and transitions from upward movement to downward movement. The rocker assembly 170 also comes to a temporary stop as it reaches the bottom of its range of motion and transitions from counterclockwise rotation to clockwise rotation.

Figure 4:
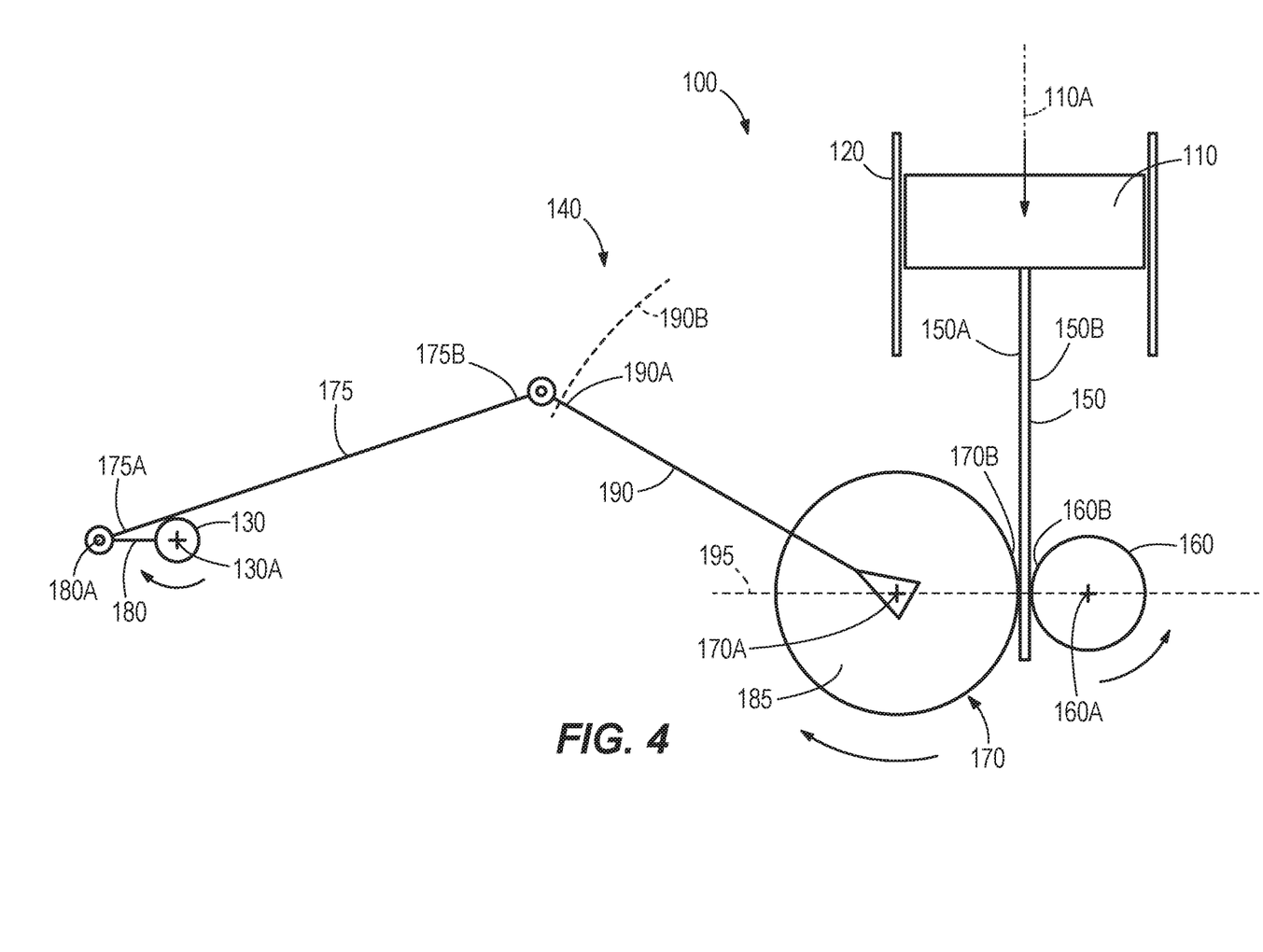
FIG. 4 is a schematic representation of the basic components and functionality of the present invention in a fourth position of operation.

In FIG. 4, the web 180 has continued its clockwise rotation to nine o'clock, as the slider 110 descends from top dead center. The rocker arm 190 is now rotating up in the clockwise direction.

Figure 5:
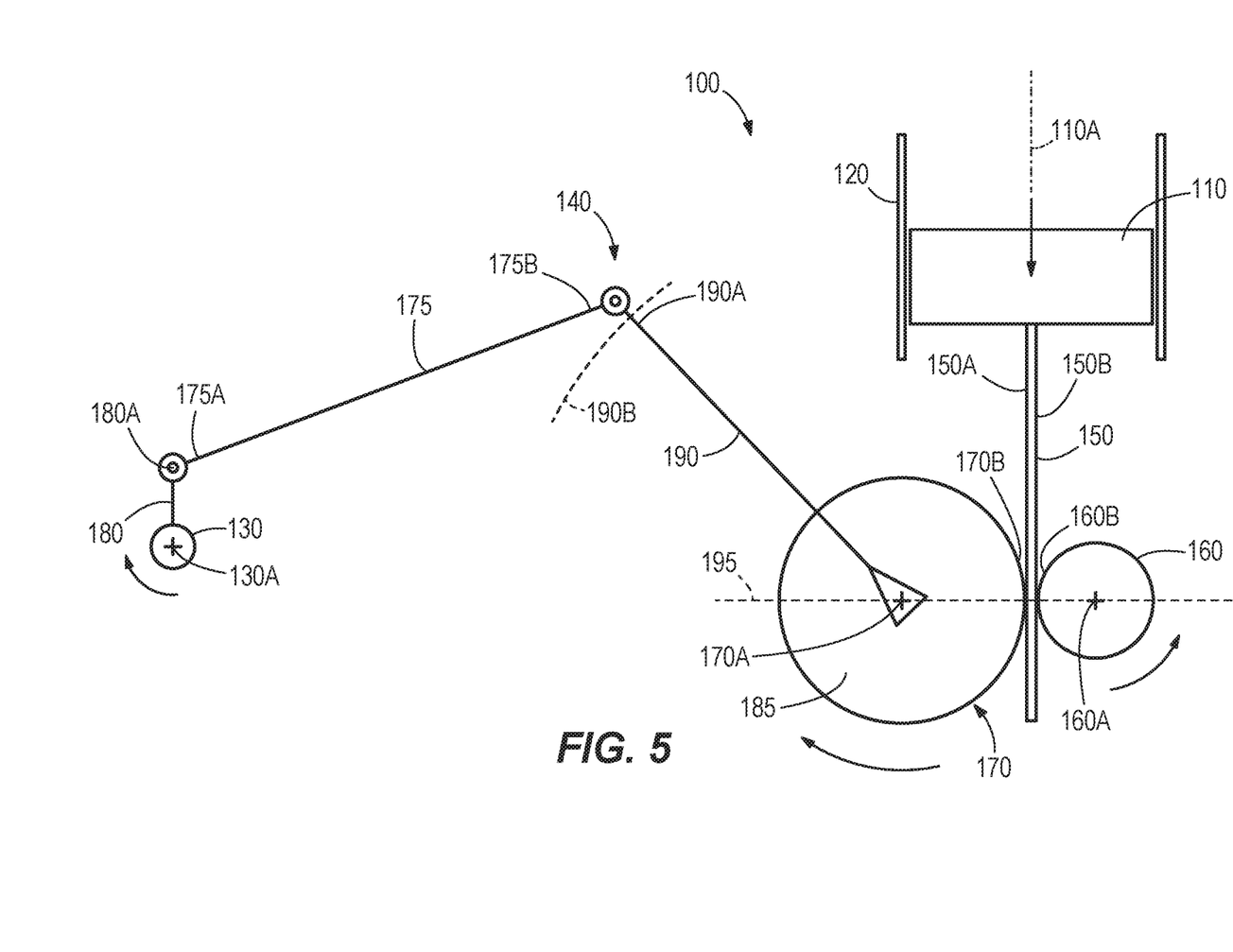
FIG. 5 is a schematic representation of the present invention in a fifth position corresponding to bottom dead center.

In FIG. 5, the web 180 has reached twelve o'clock in its clockwise rotation as the slider 110 descends below the halfway point and the rocker arm 190 continues its upward rotation in the clockwise direction.

In FIG. 6, the slider 110 is at bottom dead center. The web 180 and floating link 175 are aligned and are extensions of each other. The web 180 is at about one-thirty on an imaginary clock face. The slider 110 comes to a temporary stop as it reaches the bottom of its range of motion and transitions from the downward stroke to the upward stroke. The rocker assembly 170 also comes to a temporary stop as it reaches the top of its range of motion and transitions from clockwise rotation to counterclockwise rotation. The next stroke begins as the slider 110 moves to the position of FIG. 1.

If the linear actuator 150 is perfectly aligned with the slider axis 110A and is held in alignment between the rotary component 185 and the support member 160, the forces exchanged between the slider 110 and the linear actuator 150 are purely collinear with the slider axis 110A. In such perfect alignment, there are no side forces (i.e., off-axis forces having a component of force perpendicular to the slider surface 120 or slider axis 110A).

FIGS. 7-11 illustrate a potential commercial embodiment of the present invention, it being understood that this is only one example of a commercial embodiment and that the invention is capable of many other embodiments. The illustrated embodiment is a power generation machine in the form of a four-stroke four-cylinder internal combustion engine 200. Many of the components correlate directly with the schematic illustrations of FIGS. 1-6. For such components that correlate directly, the reference number will be indexed by 100 into the 200 series.

Figure 7:
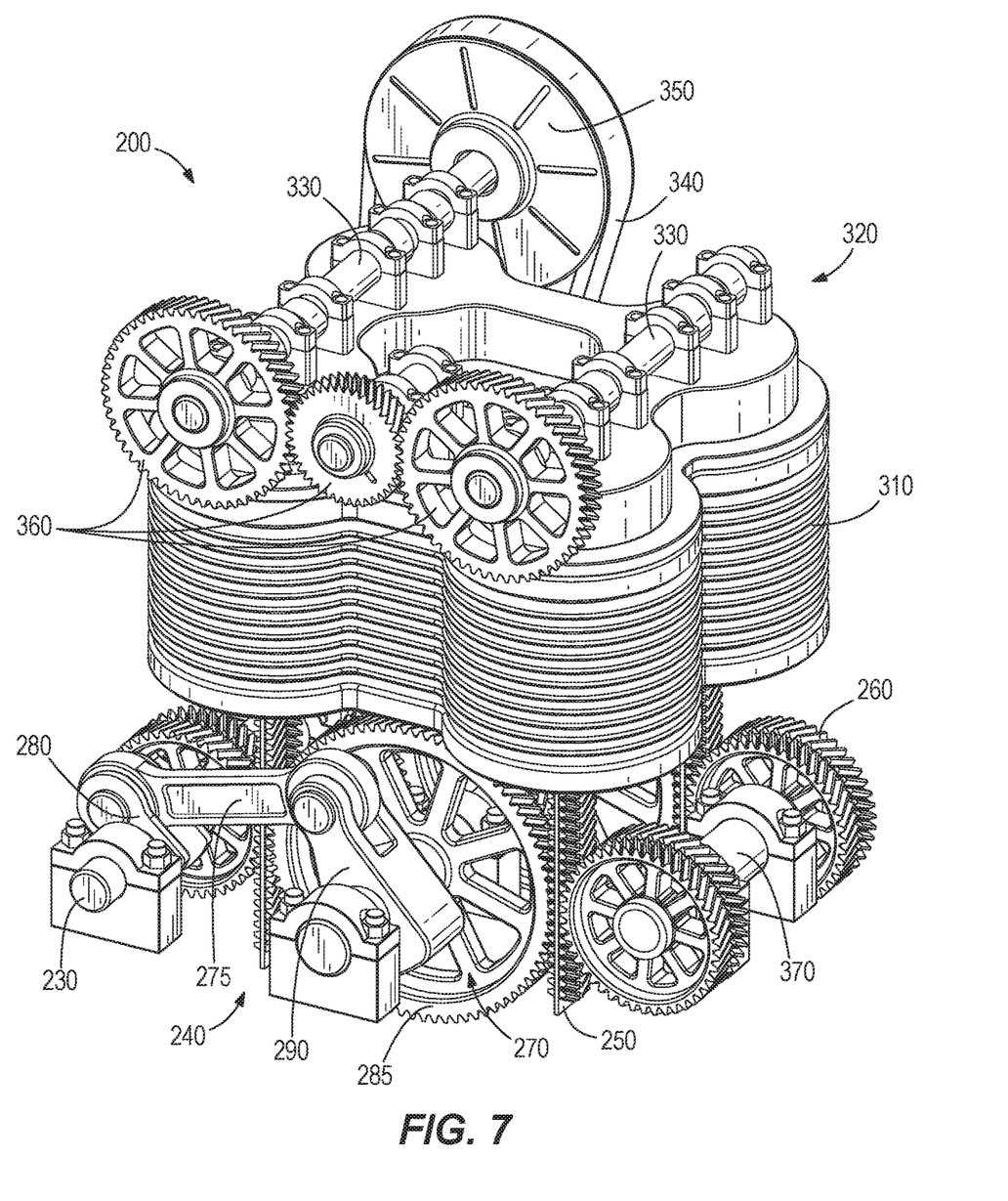
FIG. 7 is a perspective view of an engine embodying the invention.
Figure 8:
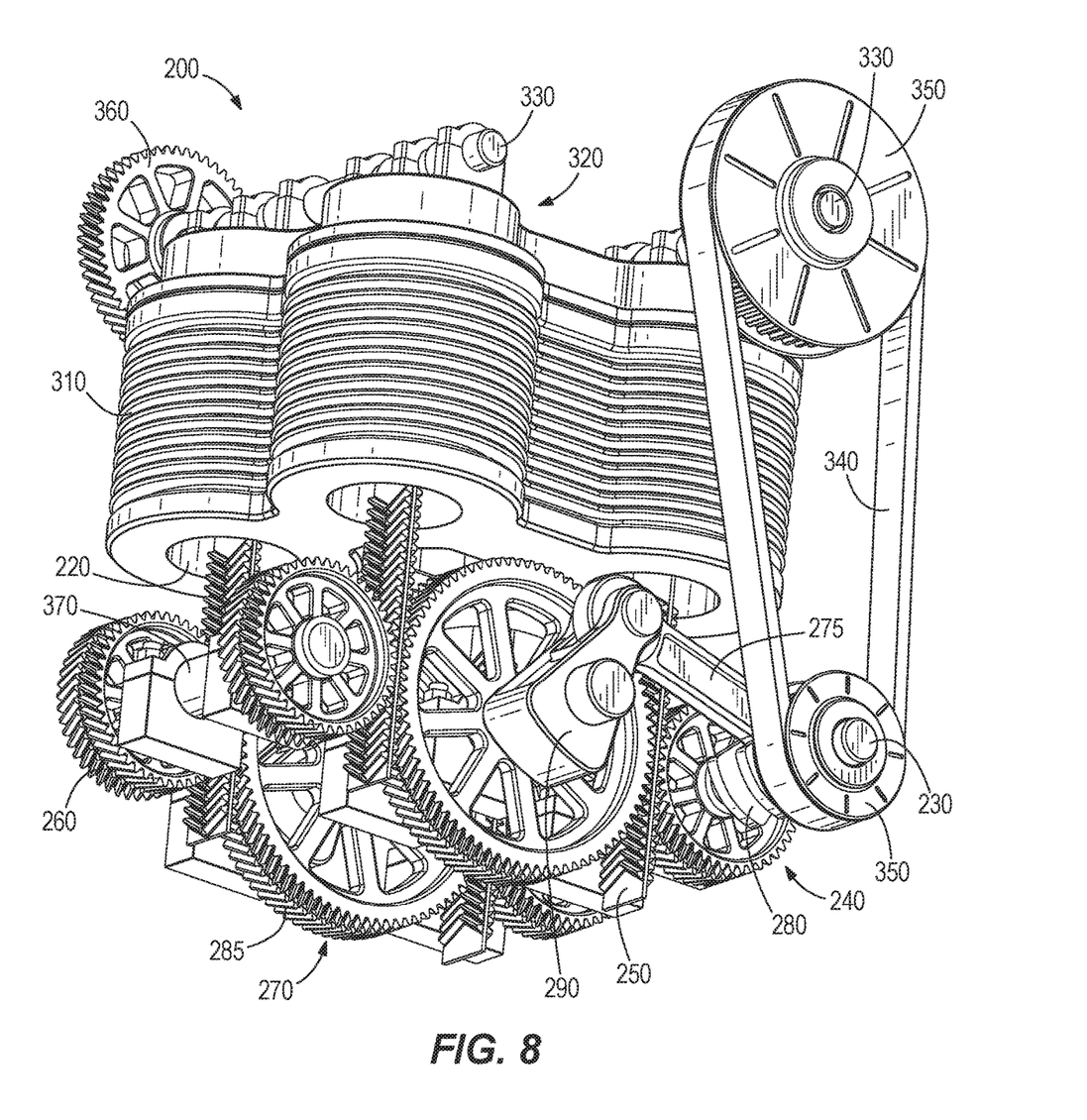
FIG. 8 is another perspective view of the engine.

As seen in FIGS. 7-10, the engine 200 embodies a power generation machine including the slider-crank mechanism of the present invention. For reference, a crankshaft 230 runs along the right side of the engine 200. The power takeoff of the crankshaft 230 is on the front side of the engine 200. As such, FIG. 7 is a perspective view of the top, front, and left sides of the engine 200 and FIG. 8 is a perspective view of the bottom, rear, and left sides of the engine 200.

The engine 200 includes the following components which correlate to the components described above for FIGS. 1-6 (where there are multiple components, only one is labeled to reduce clutter in the drawings): a slider in the form of a four pistons 210; a slider surface in the form of four cylinder bores 220; a shaft in the form of the above-noted crankshaft 230 extends between the front and rear of the engine 200 on the right side, with the front end of the crankshaft 230 operating as or connecting to the power takeoff (PTO); front and rear drive trains 240; a linear actuator in the form of four racks 250 associated with the four pistons 210; a support member in the form of four pinions 260; front and rear rocker assemblies 270; front and rear floating links 275; front and rear pairs of webs 280; a rotary component in the form of front and rear rotary gears 285; and front and rear rocker arms 290.

As noted, there are four pistons 210 in the illustrated engine 200 and each has a depending rack 250. As with the schematic example of FIGS. 1-6, the pistons 210 reciprocate in the bores 220 along a slide axis, which is the longitudinal axis of the bores 220. The racks 250 are perfectly aligned or as perfectly aligned as possible with the slide axis 210A to eliminate or reduce to negligible side forces between the pistons 210 and the bores 220.

Figure 10:
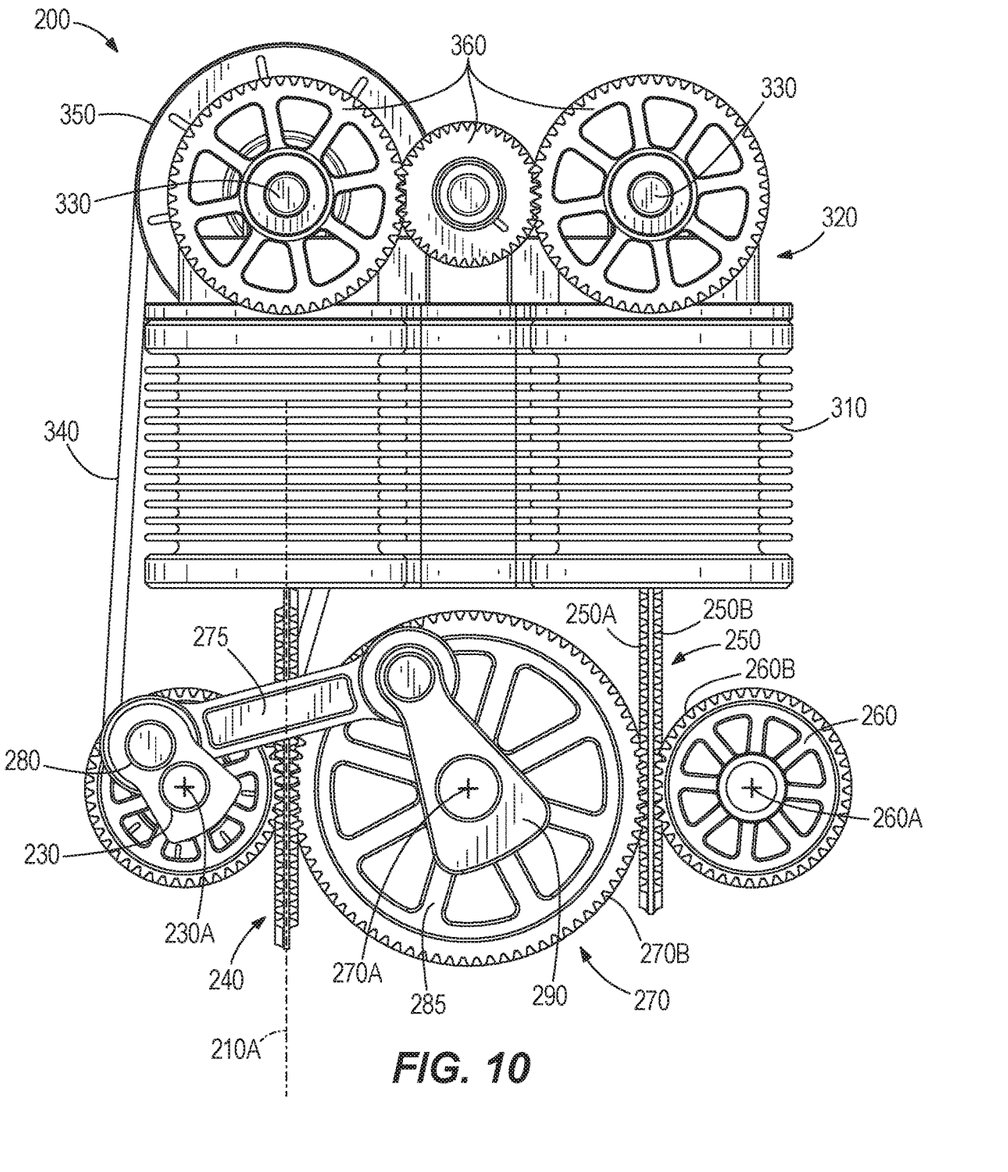
FIG. 10 is a front view of the engine.

With reference to FIG. 10, each rack 250 extends on a tangent with respect to one of the rotary gears 285. The front rotary gear 285 is engaged by the two front racks 250 and the rear rotary gear 285 is engaged by the two rear racks 250. The tangent points at which the racks 250 engage the rotary gear 285 are 180 degrees apart, at diametrically-opposed sides of the rotary gear 285.

Figure 11:
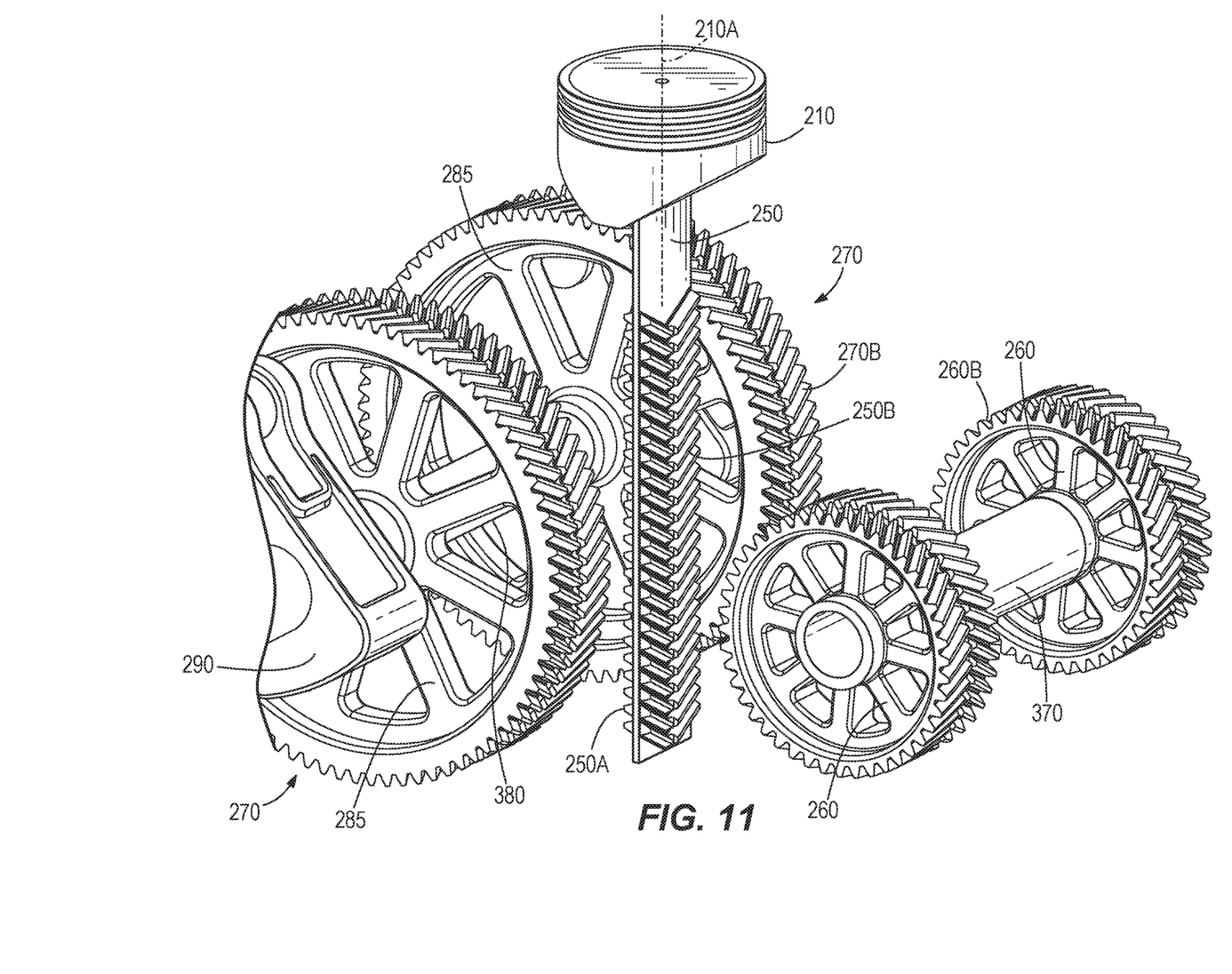
FIG. 11 an enlarged exploded view of the components of the engine.

As illustrated in FIG. 11, the first and second engagement surfaces 250A, 250B of the racks 250 include gear teeth in a herringbone helical configuration. In other constructions, the gear teeth may be in a herringbone configuration or a double helical configuration. The teeth of the rocker engagement surface 270B and the teeth of the pinion engagement surface 260B are also of helical herringbone configuration to mesh with the teeth of the first and second engagement surfaces 250A, 250B. The herringbone helical teeth cancel axial (with respect to the rotary gears 285 and pinions 260 axes of rotary oscillation) reaction forces produced in typical helical gears. The assembly of racks 250, rotary gears 285, and pinions 260 also eliminates radial reaction forces (normal to the slider axis 210A) that are generated by the helical gear teeth configuration.

From the point of view of FIG. 10, clockwise rotation of the front rotary gear 285 correlates to rising of the left front rack 250 and lowering of the right front rack 250. The pistons 210 associated with the pair of racks 250 on each rotary gear 285 are therefore 180 degrees out of phase, with one of the pistons 210 at the top of its stroke as the other at the bottom. In the example of the engine 200, this means that each rocker assembly 270 is actuated by two racks 250. As the rocker assembly 270 rotationally reciprocates about the rocker axis 270A, the floating link 275 applies torque to the crankshaft 230 through the web 280 to cause pure continuous rotation of the crankshaft 230.

Figure 9:
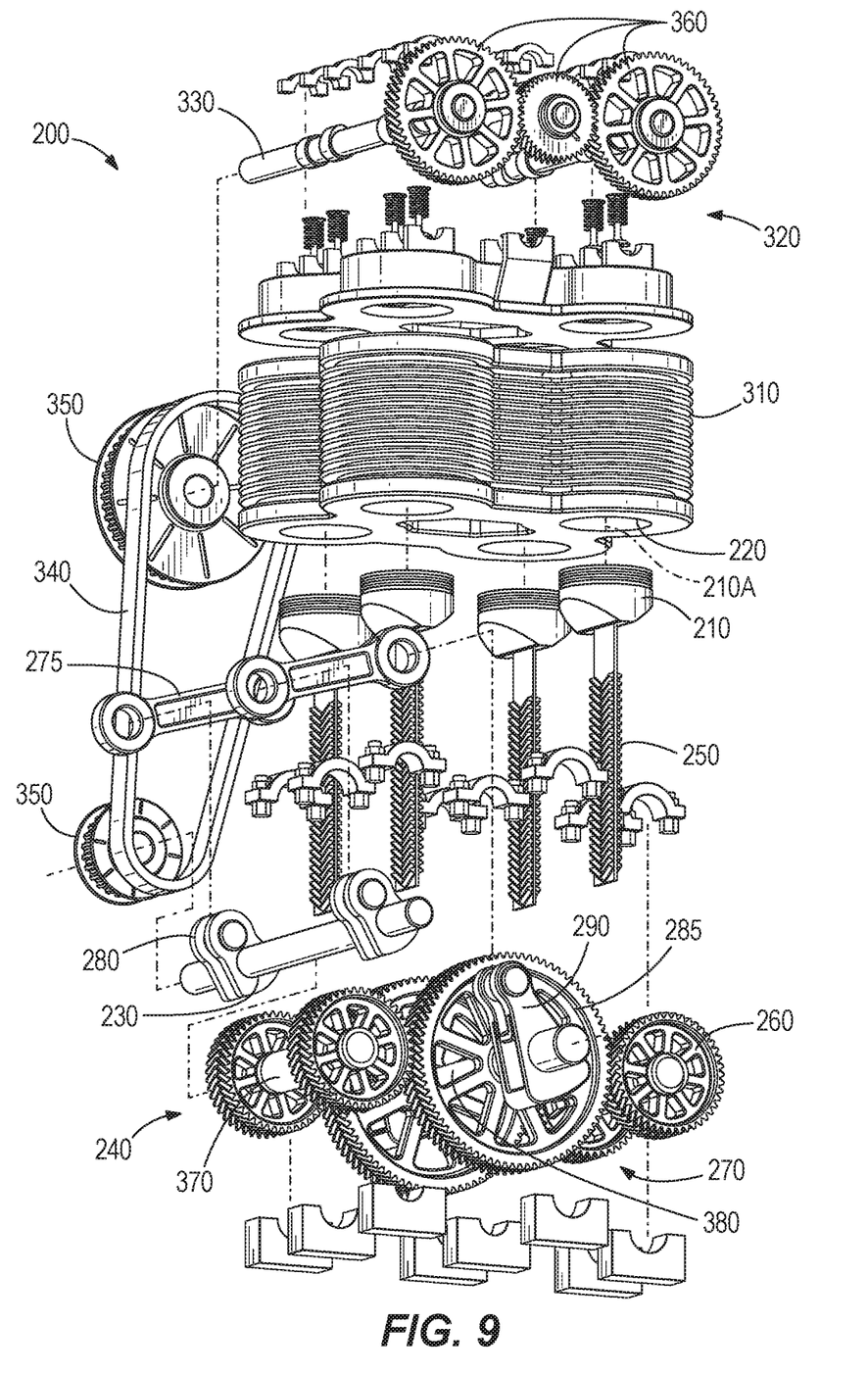
FIG. 9 is an exploded view of the engine.

As can be seen in FIG. 9, the front and rear webs 280 are in phase with each other (i.e., affixed at the same angle on the crankshaft 230). This means that the front and rear drive trains 240 operate in phase as well. Consequently, the front and rear pistons 210 on the left side are in phase with each other and the front and rear pistons 210 on the right side are in phase with each other.

In addition to the basic components that correspond to the schematic representation of the invention 100, the engine 200 includes some engine-related features worth noting. With reference to FIGS. 9, the engine 200 includes an engine block 310 into which the cylinder bores 220 are formed. The engine also includes an engine head 320 that sits over the top of the bores 220. The engine head 320 includes left and right cam shafts 330 that operate inlet and outlet valves for respect left and right bores 220. The right cam shaft 330 is driven by a timing belt 340 (or timing chain) and timing pulleys 350 on the rear end of the crankshaft 230 and the rear end of the right cam shaft 330. The right cam shaft 330 drives the left cam shaft 330 via synching gears 360 at the front ends of the cam shafts 330.

With reference to FIGS. 8, 9, and 11, the front and rear pinions 260 on the left side and the front and rear pinions 260 on the right side are coupled into pairs with a connecting shaft 370. As a result, there is a left pair of pinions 260 (front and rear) and a right pair of pinions 260 (front and rear) that oscillate (i.e., move in rotary oscillation) in perfect synchronicity. The front and rear rocker assemblies 270 are similarly coupled with a connecting shaft 380. The connecting shaft 370 of the right pair of pinions 260 is hollow and the crankshaft 230 is coaxially housed in the hollow connecting shaft 370 so that the crankshaft 230 and hollow connecting shaft 370 rotate freely with respect to each other. All shafts discussed in this description are supported for rotation by suitable bearings, such as pillow blocks.

It will be understood that an energy source such as gasoline, diesel, or other combustible fluid can be used to drive reciprocation of the pistons 210. It will also be understood that if the slider-crank mechanism is employed in a power consuming machine, that it will run essentially in reverse of the above-described engine 200. For example, in a power consuming machine such as a compressor or pump, a source of energy is used to drive rotation of the crankshaft 230. The source of energy might be the effort of an operator manually rotating a crankshaft 230 or might be a conventional motor or engine that drives rotation the crankshaft 230. Rotation of the crankshaft 230 causes the pistons 210 to reciprocate, which can be used to compress or pump a fluid in the bores 220.

Thus, the invention provides, among other things, a slider-crank mechanism that eliminates side forces between the slider and the slider support surface. Various features and advantages of the invention are set forth in the following claims.

What is claimed is:

1. A slider-crank mechanism for use in an internal combustion engine, the slider-crank mechanism comprising:
   first and second cylinder bores, each defining a longitudinal axis;
   first and second pistons supported for reciprocation within the respective first and second cylinder bores along the longitudinal axis of the respective first and second cylinder bores;
   a crankshaft for rotation about a crankshaft axis;
   first and second linear actuators connected to the respective first and second pistons for substantially pure collinear movement therewith to substantially eliminate side forces between the first and second pistons and the respective first and second cylinder bores;
   a connecting shaft defining a rocker pivot axis that is parallel to and at a fixed position with respect to the crankshaft axis;
   a rocker arm mounted to the connecting shaft for rotary oscillation therewith about the rocker pivot axis and extending away from the rocker pivot axis;
   a web rigidly connected to the crankshaft for rotation therewith and extending away from the crankshaft axis;
   a floating link pivotally coupled at a first end to the rocker arm at a distance from the rocker pivot axis and pivotally coupled at a second end to the web at a distance from the crankshaft axis;
   a rotary component affixed to the connecting shaft for rotation therewith and engaging the first and second linear actuators such that linear reciprocation of the first and second linear actuators causes rotary oscillation of the rotary component, connecting shaft, and rocker arm; and
   wherein the floating link, rocker arm, and web together define a Grashofian four bar linkage having a time ratio of one such that a stroke of the rocker arm corresponds to 180 degrees of rotation of the crankshaft and a full cycle of operation of the rocker arm corresponds to 360 degrees of rotation of the crankshaft; and
   wherein the Grashofian four bar linkage drives continuous rotation of the crankshaft in response to reciprocation of the first and second pistons.

2. The slider-crank mechanism of claim 1, wherein:
   each of the first and second linear actuators has gear teeth;
   the rotary component has rotary gear teeth; and
   the gear teeth of the first and second linear actuators are in meshing engagement with the rotary gear teeth.

3. The slider-crank mechanism of claim 2, wherein the gear teeth on the first and second linear actuators and rotary gear teeth are arranged in a herringbone helical, herringbone, or double helical configuration.

4. The slider-crank mechanism of claim 2, further comprising first and second support members supported for rotation adjacent the respective first and second linear actuators positioned between the first support member and the rotary component to maintain the first engagement with the rotary component, and the second linear actuator positioned between the second support member and the rotary component to maintain the second linear actuator in engagement with the rotary component.

5. The slider-crank mechanism of claim 1, wherein the first and second pistons reciprocate 180 degrees out of phase with each other.

6. The slider-crank mechanism of claim 1, wherein the first and second linear actuators engage diametrically-opposed portions of the rotary member.

7. The slider-crank mechanism of claim 1, the slider-crank mechanism further comprising:
   third and fourth cylinder bores, each defining a longitudinal axis;
   third and fourth pistons supported for reciprocation within the respective third and fourth cylinder bores along the longitudinal axis of the respective third and fourth cylinder bores;
   third and fourth linear actuators connected to the respective third and fourth pistons for substantially pure collinear movement therewith to substantially eliminate side forces between the third and fourth pistons and the respective third and fourth cylinder bores; and
   a second rotary component affixed to the connecting shaft for rotation therewith and engaging the third and fourth linear actuators such that linear reciprocation of the third and fourth linear actuators causes rotary oscillation of the second rotary component and the connecting shaft.

8. The slider-crank mechanism of claim 7, wherein the third and fourth pistons reciprocate 180 degrees out of phase with each other.

9. The slider-crank mechanism of claim 7, wherein the third and fourth linear actuators engage diametrically-opposed portions of the second rotary member.

10. The slider-crank mechanism of claim 7, wherein the first and third pistons reciprocate in phase with each other and the second and fourth pistons reciprocate in phase with each other.

11. An engine comprising:
a fixed position crankshaft for rotation about a fixed crankshaft axis;
a web rigidly mounted to the crankshaft and extending away from the crankshaft axis;
a piston bore defining a slide axis;
a piston for reciprocation along the slide axis within the cylinder bore under the influence of combustion;
a rack connected to the piston for substantially pure linear movement with the piston along the slide axis and including a rocker engagement surface having gear teeth and a pinion engagement surface facing opposite the rocker engagement surface and having gear teeth;
a fixed position rotary gear having rotary gear teeth in meshing engagement with the gear teeth of the rocker engagement surface of the rack, the rotary gear supported for rotation about a fixed rotary axis;
a pinion having pinion gear teeth in meshing engagement with the gear teeth of the pinion engagement surface of the rack, the pinion supported for rotation about a pinion axis such that the rack is supported between the rotary gear and the pinion for substantially pure reciprocating collinear movement of the rack with the piston;
a rocker arm mounted for rotary oscillation with rotary gear; and
a floating link pivotally connected to the rocker arm and pivotally connected to the web such that reciprocation of the piston results in continuous rotation of the crankshaft.

12. The engine of claim 11, further comprising:
a second piston bore defining a second slide axis;
a second piston for reciprocation along the second slide axis within the second cylinder bore under the influence of combustion;
a second rack connected to the second piston for substantially pure linear movement with the second piston along the second slide axis and including a rocker engagement surface having gear teeth in meshing engagement with the rotary gear teeth and a pinion engagement surface facing opposite the rocker engagement surface and having gear teeth;
a second pinion having gear teeth in meshing engagement with the gear teeth of the pinion engagement surface of the second rack, the second pinion supported for rotation about a second pinion axis, the second rack being supported between the rotary gear and the second pinion for substantially pure reciprocating collinear movement with the second piston.

13. The engine of claim 11, wherein the gear teeth of the rocker engagement surface and the pinion engagement surface of the rack and the rotary gear teeth are in a herringbone helical, herringbone, or double helical configuration.

14. An internal combustion engine comprising:
four cylinder bores, each defining a longitudinal axis;
four pistons, each supported for reciprocation within an associated cylinder bore along a longitudinal axis of the associated cylinder bore;
a crankshaft for rotation about a crankshaft axis;
four linear actuators, each connected to an associated one of the pistons for substantially pure collinear movement therewith to substantially eliminate side forces between the pistons and the associated cylinder bores;
a connecting shaft defining a rocker pivot axis that is parallel to and at a fixed position with respect to the crankshaft axis;
a rocker arm mounted to the connecting shaft for rotary oscillation therewith about the rocker pivot axis and extending away from the rocker pivot axis;
a web rigidly connected to the crankshaft for rotation therewith and extending away from the crankshaft axis;
a floating link pivotally coupled at a first end to the rocker arm at a distance from the rocker pivot axis and pivotally coupled at a second end to the web at a distance from the crankshaft axis;
a first rotary component affixed to the connecting shaft for rotation therewith and engaging a first pair of the four linear actuators associated with a first pair of the four pistons such that linear reciprocation of the first pair of linear actuators causes rotary oscillation of the first rotary component and the connecting shaft; and
a second rotary component affixed to the connecting shaft for rotation therewith and engaging a second pair of the four linear actuators associated with a second pair of the four pistons such that linear reciprocation of the second pair of linear actuators causes rotary oscillation of the second rotary component, the connecting shaft, and the rocker arm;
wherein the floating link, rocker arm, and web together define a Grashofian four bar linkage having a time ratio of one such that a stroke of the rocker arm corresponds to 180 degrees of rotation of the crankshaft and a full cycle of operation of the rocker arm corresponds to 360 degrees of rotation of the crankshaft; and
wherein the Grashofian four bar linkage drives continuous rotation of the crankshaft in response to reciprocation of the four pistons.

15. The internal combustion engine of claim 14, wherein the four linear actuators include gear teeth, the first and second rotary components include gear teeth, the gear teeth of the first pair of linear actuators mesh with the gear teeth of the first rotary component, and the gear teeth of the second pair of linear actuators mesh with the gear teeth of the second rotary component.

16. The internal combustion engine of claim 15, wherein the gear teeth of the four linear actuators and the gear teeth of the first and second rotary components are in a herringbone helical, herringbone, or double helical configuration.

17. The internal combustion engine of claim 15, wherein the first pair of linear actuators engage diametrically-opposed sides of the first rotary component and the second pair of linear actuators engage diametrically-opposed sides of the second rotary component.

18. The internal combustion engine of claim 15, wherein the first pair of pistons reciprocate 180 degrees out of phase with each other and the second pair of pistons reciprocate 180 degrees out of phase with each other.

19. The internal combustion engine of claim 15, wherein one of the pistons in the first pair of pistons reciprocates in phase with one of the pistons in the second pair of pistons.

* * * * *